(12) United States Patent
Stephenson et al.

(10) Patent No.: US 8,005,030 B2
(45) Date of Patent: Aug. 23, 2011

(54) WLAN DIAGNOSTICS USING TRAFFIC STREAM METRICS

(75) Inventors: David Sheldon Stephenson, San Jose, CA (US); Arnold Mark Bilstad, Redwood City, CA (US); Wenfeng Huang, San Ramon, CA (US); Jason Kim, Los Altos, CA (US)

(73) Assignee: Cisco Technology, Inc., San Jose, CA (US)

( * ) Notice: Subject to any disclaimer, the term of this patent is extended or adjusted under 35 U.S.C. 154(b) by 924 days.

(21) Appl. No.: 11/322,749

(22) Filed: Dec. 30, 2005

(65) Prior Publication Data

US 2008/0253314 A1    Oct. 16, 2008

(51) Int. Cl.
*H04B 7/00* (2006.01)

(52) U.S. Cl. ........ 370/310; 370/328; 370/338; 370/331; 370/332; 370/350

(58) Field of Classification Search ........... 370/310–350
See application file for complete search history.

(56) References Cited

U.S. PATENT DOCUMENTS

| | | | |
|---|---|---|---|
| 7,394,797 B2 * | 7/2008 | Kowalski | 370/338 |
| 2004/0058652 A1 * | 3/2004 | McGregor et al. | 455/67.13 |
| 2006/0146869 A1 * | 7/2006 | Zhang et al. | 370/465 |
| 2007/0002890 A1 * | 1/2007 | Mangold et al. | 370/459 |

OTHER PUBLICATIONS

Dan Simone, 802.11k makes WLANS measure up, Network World, Mar. 29, 2004, www.networkworld.com/news/tech/2004/0329techupdate.html.

* cited by examiner

*Primary Examiner* — Kamran Afshar
*Assistant Examiner* — Sayed T Zewari
(74) *Attorney, Agent, or Firm* — Baker Botts L.L.P.

(57) ABSTRACT

Methods, apparatuses and systems directed to facilitating WLAN diagnostics and management using traffic stream metrics. In a data collection stage, according to one implementation of the present invention, localized uplink measurements are taken at a wireless client associated with a wireless access point. During periodic intervals (e.g., every 5 seconds), the wireless client, in one implementation, transmits uplink measurement information to the wireless access point. The wireless access point may also take downlink measurements, which may also include one or more of the following metrics: observed latency, queuing delay, packet loss rate, and packet count information. The wireless access point, in one implementation, may aggregate and report the uplink and downlink metric information to a network management system. In a diagnostic stage, according to one implementation, a wireless network management module performs diagnostics of the WLAN based on the uplink and/or downlink metrics received from the wireless access-point.

35 Claims, 11 Drawing Sheets

WLAN DIAGNOSTICS USING TRAFFIC STREAM METRICS

CROSS-REFERENCE TO RELATED APPLICATIONS AND PATENTS

This application makes reference to the following commonly owned U.S. patent applications and/or patents, which are incorporated herein by reference in their entirety for all purposes:

U.S. patent application Ser. No. 10/407,584 in the name of Patrice R. Calhoun, Robert B. O'Hara, Jr. and Robert J. Friday, entitled "Method and System for Hierarchical Processing of Protocol Information in a Wireless LAN;"

U.S. patent application Ser. No. 10/888,691 in the name of Xiaode Xu, Huizhao Wang, Wenfeng Huang, Arnold Bilstad, and David Stephenson, entitled "Method and Apparatus for Optimizing Cell Operation Toward Better Speech Quality in Wireless Packet-Switching;" and U.S. patent application Ser. No. 11/195,536 in the name of Brian Cox, Bruce McMurdo and Anuradha Gade, entitled "Method and System for Dynamic Assignment of Wireless LAN Access Point Identity."

FIELD OF THE INVENTION

The present invention relates to wireless networks and, more particularly, to methods, apparatuses and systems directed to facilitating diagnostic and management tasks associated with a wireless network.

BACKGROUND OF THE INVENTION

Market adoption of wireless LAN (WLAN) technology has exploded, as users from a wide range of backgrounds and vertical industries have brought this technology into their homes, offices, and increasingly into the public air space. This inflection point has highlighted not only the limitations of earlier-generation systems, but also the changing role WLAN technology now plays in people's work and lifestyles, across the globe. Indeed, WLANs are rapidly changing from convenience networks to business-critical networks. Increasingly users are depending on WLANs to improve the timeliness and productivity of their communications and applications, and in doing so, require greater visibility, security, management, and performance from their network.

In Voice over Internet protocol (VoIP) systems and in particular VoIP over WLAN systems there are many points in the network that can cause audio impairments to the end users. For example, congestion or interference associated with the WLAN, or congestion on a WAN connection, may degrade network throughput and hence VoIP performance. Also, there may be networking equipment that is misconfigured or has latent bugs which impair the quality of service provided to real time protocol streams. For VoIP over WLAN calls (hereinafter referred to as VoWLAN), there is the added complexity which arises from user mobility. Since users may often roam between several wireless access points during the course of a call, a quality of service issue may only occur when the user's mobile station is associated with certain wireless access points. For example, poor quality of service may be caused by interference (e.g., a microwave oven) that is near only one of the wireless access points used during the call. In this situation, a network administrator, when attempting to diagnose the problem, may not recognize that the QoS issue only happens in certain areas of the building. Furthermore, that the problem appears to the end-user as intermittent may render it difficult for a network administrator to determine the root cause of an end-user's complaint.

Several enterprises direct efforts to monitor network performance and gather data to facilitate diagnosis of network performance issues. However, the disadvantage of these efforts is that they focus on wired WANs and LANs. Hence, these efforts do not account for user mobility or the RF environment. In addition, prior efforts typically involve end-to-end measurements to assess performance of the network. However, the disadvantage of this is that the measurements do not provide information concerning a single link (i.e., one segment of and end-to-end connection). Furthermore, known diagnostic systems do not address network performance issues related to roaming.

In light of the foregoing, a need in the art exists for methods, apparatuses, and systems that address the foregoing problems and facilitate WLAN diagnostics and management. Embodiments of the present invention substantially fulfill this need.

DESCRIPTION OF PREFERRED EMBODIMENT(S)

A. Overview

The present invention provides methods, apparatuses and systems directed to facilitating WLAN diagnostics and management using traffic stream metrics. In a data collection stage, according to one implementation of the present invention, localized uplink measurements are taken at a wireless client associated with a wireless access point. In one implementation, such uplink measurements may include one or more of the following metrics: observed latency, queuing delay, packet loss rate, packet drop count, packet count, roaming time, and roam count information as described in more detail below. During periodic intervals (e.g., every 5 seconds), the wireless client, in one implementation, transmits uplink measurement information to the wireless access point. The wireless access point may also take downlink measurements, which may also include one or more of the following metrics: observed latency, queuing delay, packet loss rate, packet drop count, and packet count information. In one implementation, the wireless access point updates a table with the uplink metrics reported from the wireless client and the downlink metrics measured by the wireless access point. The wireless access point, in one implementation, may then aggregate and report the uplink and downlink metric information to a network management system or other data collection node. For example, during periodic intervals (e.g., every 90 seconds), the wireless access point may transmit reports to a wireless network management module. The report may include uplink information provided by one or more wireless clients, as well downlink metrics measured by the wireless access point. In a diagnostic stage, according to one implementation, the wireless network management module performs diagnostics of the WLAN based on the uplink and/or downlink metrics received from the wireless access point, as well as other wireless access points in the WLAN infrastructure. As described in more detail below, in one implementation, the wireless network management module utilizes a fault tree/trouble shooting algorithm to determine possible causes of the faults. In a remedial action stage, according to one implementation, the wireless network management module may perform one or more corrective actions based on information from the diagnostic stage. Such corrective actions may include outputting a recommendation for a network administrator, automatically performing remedial policies, which may involve reconfiguring the wireless network, and/or providing metric information for the network administrator.

B. Exemplary Wireless Network System Architecture

B.1. Network Topology

Figure 1:
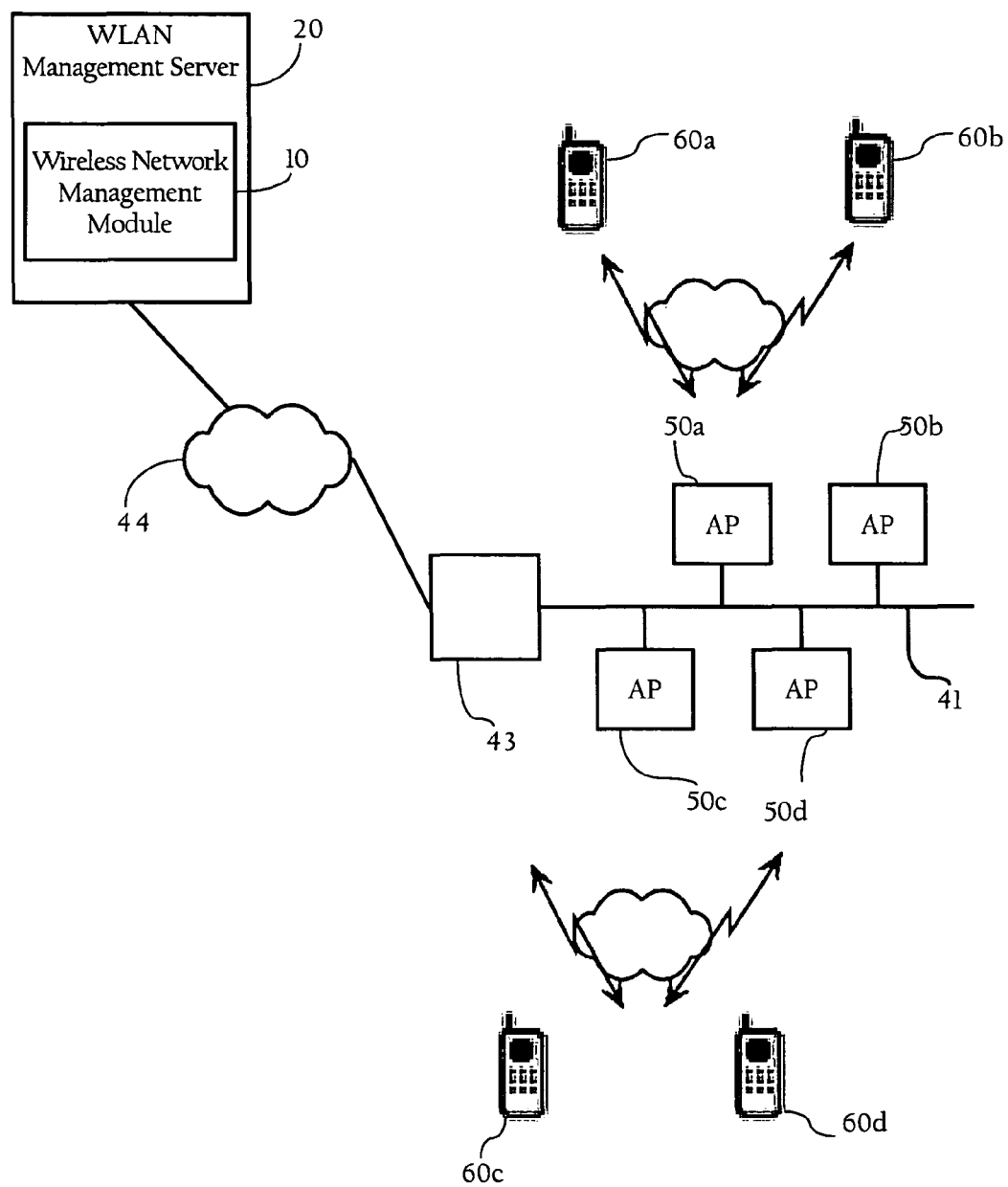
FIG. 1 is a topological diagram of the components in a wireless local area network (WLAN system according to one embodiment of the present invention.

A network environment including a wireless LAN (WLAN) according to one implementation of the present invention is shown in FIG. 1. In a specific embodiment of the present invention, the system includes a wireless network management module 10 running on a WLAN management server 20, a router 43, a local area network (LAN) 41, and wireless access points 50a, 50b, 50c, and 50d (collectively referred to as wireless access points 50). LAN 41 is implemented by a switch (or an array of switches) and/or other network devices, such as a bridge.

As FIG. 1 illustrates, these network elements are operably connected to a network 44. Network 44, in one implementation, generally refers to a computer network, such as a LAN, a WAN, etc., that includes one or more intermediate network devices (e.g., routers, switches, etc.), which allow for the transmission of messages between WLAN management server 20 and wireless access points 50. Of course, network 44 can include a variety of network segments, transmission technologies and components, such as terrestrial WAN links, satellite links, optical fiber links and cellular links; network 44 could also be a campus LAN. Network 41 may be a LAN or LAN segments implemented by an Ethernet switch (not shown) or an array of switches having multiple ports to which wireless access points 50 are connected. The wireless access points 50 are typically connected to the switch ports via Ethernet links; however, other link layer connection protocols or communication means can be employed. FIG. 1 illustrates one possible network environment in which the invention may operate; however, other implementations are possible. For example, although WLAN management server 20 is illustrated as being on a different LAN or LAN segment, it may be co-located with wireless access points 50.

The wireless access points 50 are operative to wirelessly communicate with remote wireless client devices 60a, 60b, 60c, and 60d. In one implementation, the wireless access points 50 implement the wireless network protocol specified in the IEEE 802.11 WLAN specification. The wireless access points 50 may be autonomous or so-called "fat" wireless access points, or light-weight wireless access points operating in connection with a wireless switch (not illustrated), as disclosed in U.S. patent application Ser. No. 10/407,584, now U.S. Pat. No. 7,212,837. In addition, the network infrastructure may also include a Wireless LAN Solution Engine (WLSE) offered by Cisco Systems, Inc. of San Jose, Calif. or other wireless network management system. In some implementations, the network infrastructure may also include one or more Wireless Control System (WCS) nodes operative to manage one or more wireless switches and access points. In one implementation, the wireless network management system may be implemented on WLAN management server 20. Furthermore, U.S. patent application Ser. No. 11/195,536 discloses methods and systems for automatically assigning an identity to, and configuring, the wireless access points 50. Of course, configuration and management information can be obtained in a variety of manners without departing from the scope of the present invention.

B.2. WLAN Management Server

Figure 2:
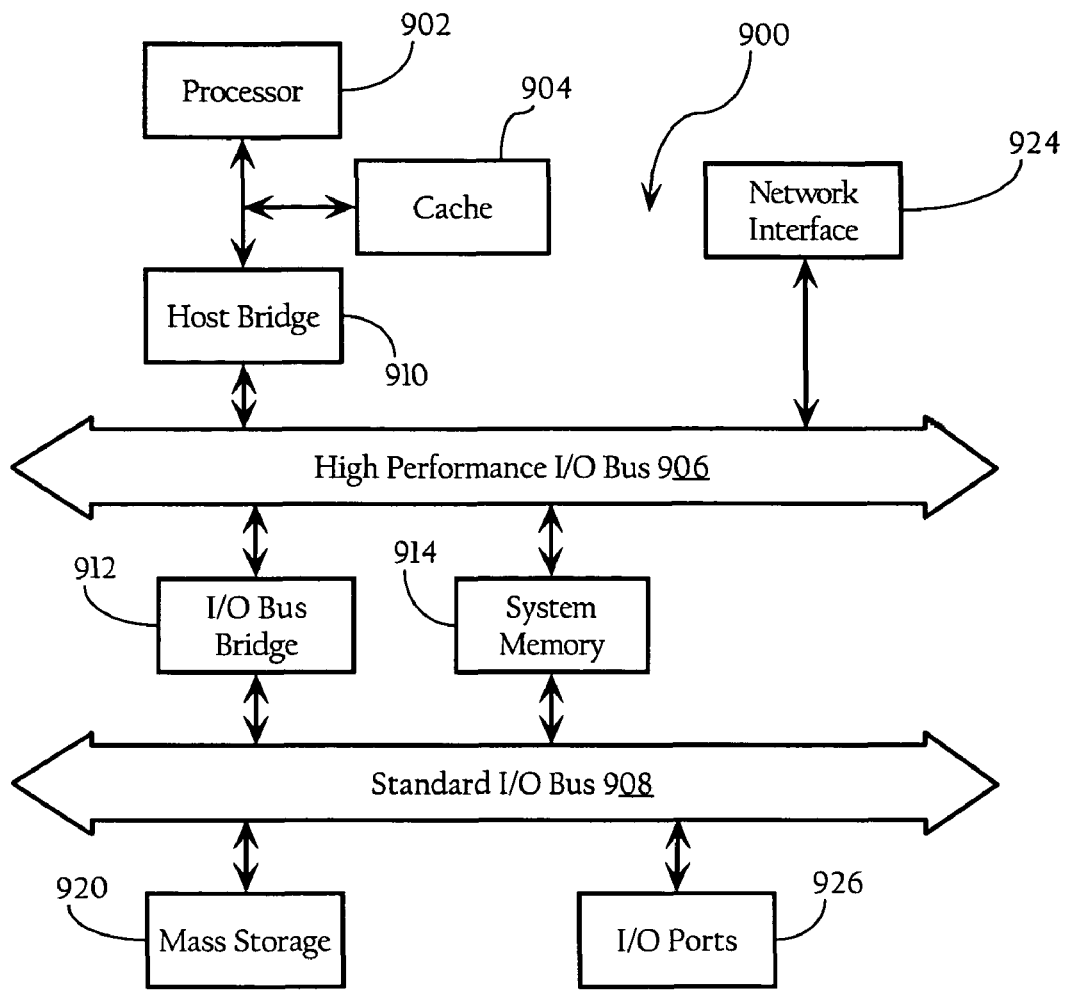
FIG. 2 illustrates for didactic purposes a hardware system 900, which may be used to implement the WLAN management server.

FIG. 2 illustrates for didactic purposes a hardware system 900, which may be used to implement the WLAN management server 20 of FIG. 1. In one implementation, hardware system 900 comprises a processor 902, a system memory 914, a network interface 924, and one or more software applications (including the wireless network management module 10 shown in FIG. 1) and drivers enabling the functions described herein.

The present invention can be implemented on a wide variety of computer system architectures. For example, FIG. 2 illustrates a hardware system 900 having components suitable for WLAN management server 20 of FIG. 1, in accordance with another implementation of the present invention. In the illustrated embodiment, the hardware system 900 includes processor 902 and a cache memory 904 coupled to each other as shown. Additionally, the hardware system 900 includes a high performance input/output (I/O) bus 906 and a standard I/O bus 908. Host bridge-910 couples processor 902 to high performance I/O bus 906, whereas I/O bus bridge 912 couples the two buses 906 and 908 to each other. Coupled to bus 906 are network/communication interface 924, and system memory 914. The hardware system may further include video memory (not shown) and a display device coupled to the video memory. Coupled to bus 908 are mass storage 920 and I/O ports 926. The hardware system 900 may optionally include a keyboard and pointing device (not shown) coupled to bus 908. Collectively, these elements are intended to represent a broad category of computer hardware systems, including but not limited to general purpose computer systems based on the Pentium® processor manufactured by Intel Corporation of Santa Clara, Calif., as well as any other suitable processor.

The elements of hardware system 900 perform their functions known in the art. In particular, network interface 924 is used to provide communication between system 900 and any of a wide range of networks, such as an Ethernet (e.g., IEEE 802.3) network, etc. Mass storage 920 is used to provide permanent storage for the data and programming instructions to perform the above described functions implemented in the system controller, whereas system memory 914 (e.g., DRAM) is used to provide temporary storage for the data and programming instructions when executed by processor 902. I/O ports 926 are one or more serial and/or parallel communication ports used to provide communication between additional peripheral devices, which may be coupled to hardware system 900.

Hardware system 900 may include a variety of system architectures, and various components of hardware system 900 may be rearranged. For example, cache 904 may be on-chip with processor 902. Alternatively, cache 904 and processor 902 may be packed together as a "processor module," with processor 902 being referred to as the "processor core." Furthermore, certain implementations of the present invention may not require nor include all of the above components. For example, the peripheral devices shown coupled to the standard I/O bus 908 may be coupled to a high performance I/O bus 906. In addition, in some implementations only a single bus may exist with the components of hardware system 900 being coupled to the single bus. Furthermore, additional components may be included in system 900, such as additional processors, storage devices, or memories.

As discussed above, in one embodiment, the operations of the WLAN management server 20 described herein are implemented as a series of software routines run by hardware system 900. These software routines comprise a plurality or series of instructions to be executed by a processor in a hardware system, such as processor 902. Initially, the series of instructions are stored on a storage device, such as mass storage 920. However, the series of instructions can be stored on any suitable storage medium, such as a diskette, CD-ROM, ROM, etc. Furthermore, the series of instructions need not be stored locally, and could be received from a remote storage device, such as a server on a network, via network/communication interface 924. The instructions are copied from the storage device, such as mass storage 920, into memory 914 and then accessed and executed by processor 902.

An operating system manages and controls the operation of hardware system 900, including the input and output of data to and from software applications (not shown). The operating system provides an interface between the software applications being executed on the system and the hardware components of the system. According to one embodiment of the present invention, the operating system is the Windows® 95/98/NT/XP operating system, available from Microsoft Corporation of Redmond, Wash. However, the present invention may be used with other operating systems, such as the Apple Macintosh Operating System, available from Apple Computer Inc. of Cupertino, Calif., UNIX operating systems, LINUX operating systems, and the like.

B.3. Wireless Access Point

Figure 3:
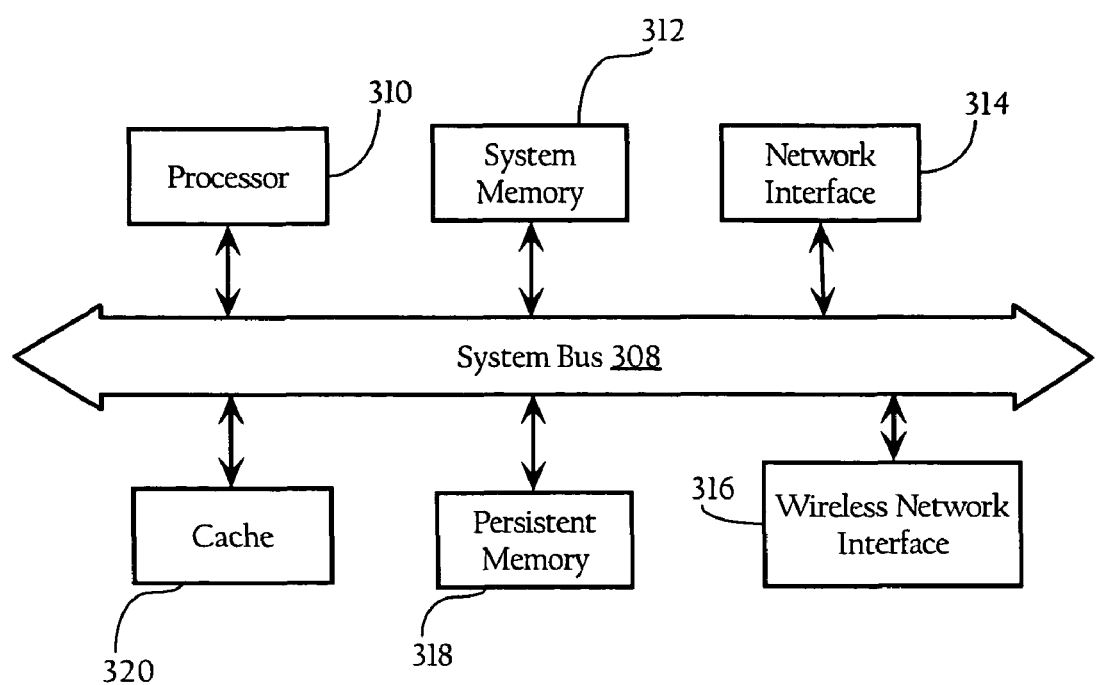
FIG. 3 illustrates for didactic purposes a wireless access point, which can be used to implement a wireless access point.

FIG. 3 illustrates for didactic purposes a component system architecture, which can be used to implement a wireless access point of FIG. 1. In one implementation, the wireless access point comprises a processor 310, a memory 312, a network interface 314 (e.g., an 802.3 interface) for communication with a LAN, a wireless network interface 316 (e.g., an IEEE 802.11 WLAN interface) for wireless communication with one or more wireless clients 60, a persistent memory 318, and a system bus 308 interconnecting these components. The wireless access points 50 may also include software modules (including DHCP clients, transparent Bridging, Lightweight Access Point Protocol (LWAPP), Cisco® Discovery Protocol (CDP) modules, wireless access point modules, SNMP functionality, etc.) and device drivers (e.g., network and WLAN interface drivers) stored in the persistent memory 318 (e.g., a hard disk drive, flash memory, etc.). At start up, these software components are loaded into memory 312 and then accessed and executed by processor 310. A wireless access point can provide quality of service (QoS) features which are typically based on 802.11e specification or Wireless Multi-Media™ specification. These features are described by the EDCA (Enhanced Distributed Channel Access) and HCCA (HCF Coordinated Channel Access) mechanisms. These mechanisms implement QoS and thus provide differentiated services for clients. For example, EDCA provides for 4 separate transmit queues name AC_VO (designated for voice services), AC_VI (designated for video services), AC_BE (designated for best-effort data services) and AC_BK (for background services—less than BE). Each transmit queue has its own set of access parameters which provide statistical prioritization to the medium. AC_VO provides the fastest access, which is very useful for low-latency services such as voice. AC_VI provides the next fastest access to the medium followed by AC_BE and then by AC_BK. Since packets transmitted in the AC_VO queue get faster access to the medium, services using other queues will be delayed due to these packets. For example, email packets using AC_BE will be delayed due to voice packets.

Traffic stream metrics can be used to measure the delay, packet loss rate, packet drop count and packet count for all the queues discussed above, however, in some implementations, metrics are maintained only for the AC_VO and AC_VI queues, as they are the more important from a QoS and end-user perspective. This is because these queues typically carry services which are significant impaired by delay and packet loss, such as voice and video conferencing traffic respectively. It is worthwhile noting that when a wireless client is not roaming, the only impairments possible for a WLAN to impart are packet delay and packet loss. Packet delay and packet loss are also possible during the time a wireless client is in the process of roaming; the degree of impairment is proportional to the roaming time.

B.4. Wireless Client

Figure 4:
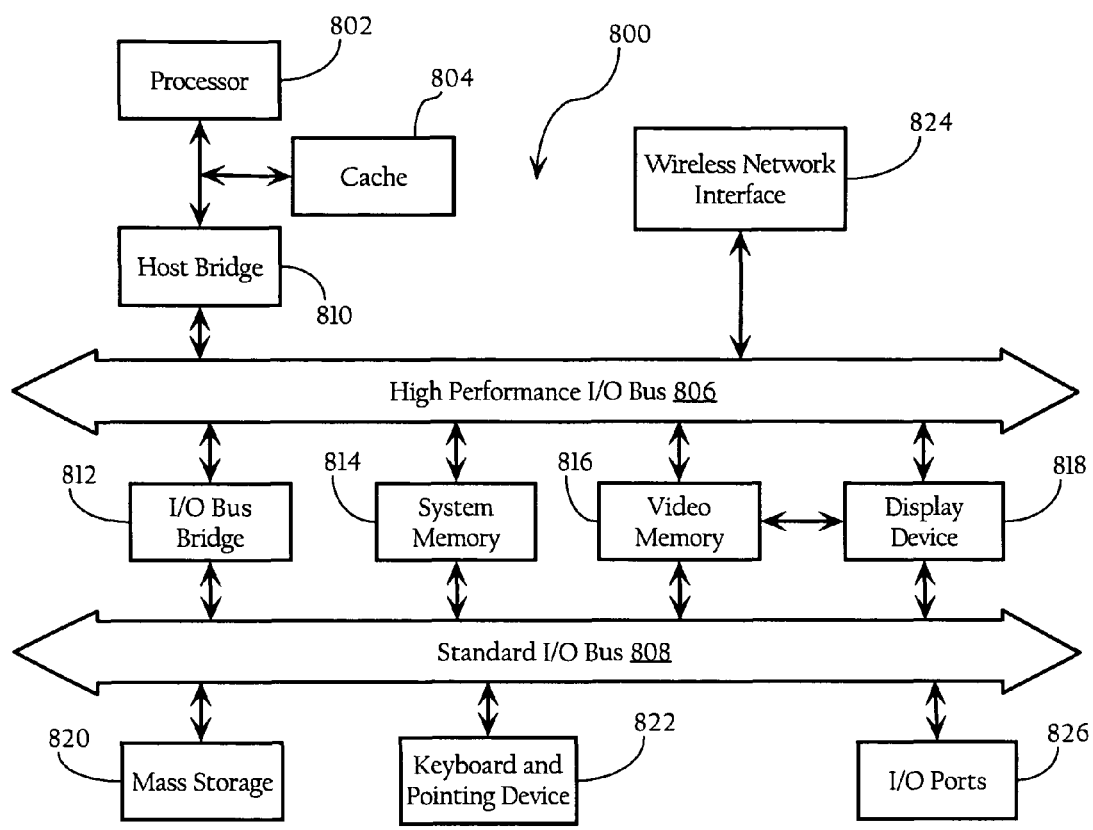
FIG. 4 illustrates for didactic purposes a hardware system, which can be used to implement a wireless client.

FIG. 4 illustrates for didactic purposes a hardware system 800, which can be used to implement a wireless client of FIG. 1. In one embodiment, hardware system 800 includes processor 802 and cache memory 804 coupled to each other as shown. Additionally, hardware system 800 includes high performance input/output (I/O) bus 806 and standard I/O bus 808. Host bridge 810 couples processor 802 to high performance I/O bus 806, whereas I/O bus bridge 812 couples the two buses 806 and 808 to each other. Coupled to bus 806 are network/communication interface 824, system memory 814, and video memory 816. In turn, display device 818 is coupled to video memory 816. Coupled to bus 808 are mass storage 820, keyboard and pointing device 822, and I/O ports 826. Collectively, these elements are intended to represent a broad category of computer hardware systems, including but not limited to general purpose computer systems based on the Pentium® processor manufactured by Intel Corporation of Santa Clara, Calif., as well as any other suitable processor.

The elements of hardware system 800 are described in greater detail below. In particular, wireless network interface 824 is used to provide communication between system 800 and any of a wide range of wireless networks, such as a WLAN (i.e., IEEE 802.11), WiMax (i.e., IEEE 802.16), Cellular (e.g., GSMA), etc. Mass storage 820 is used to provide permanent storage for the data and programming instructions to perform the above described functions implemented in the system controller, whereas system memory 814 (e.g., DRAM) is used to provide temporary storage for the data and programming instructions when executed by processor 802. I/O ports 826 are one or more serial and/or parallel communication ports used to provide communication between additional peripheral devices, which may be coupled to hardware system 800.

Hardware system 800 may include a variety of system architectures and various components of hardware system 800 may be rearranged. For example, cache 804 may be on-chip with processor 802. Alternatively, cache 804 and processor 802 may be packed together as a "processor module", with processor 802 being referred to as the "processor core". Furthermore, certain implementations of the present invention may not require nor include all of the above components. For example, the peripheral devices shown coupled to standard I/O bus 808 may be coupled to high performance I/O bus 806. In addition, in some implementations only a single bus may exist with the components of hardware system 800 being coupled to the single bus. Furthermore, additional components may be included in system 800, such as additional processors, storage devices, or memories.

In one embodiment, the operations of wireless client-side roaming functionality are implemented as a series of software routines run by hardware system 800. These software routines, which can be embodied in a wireless network interface driver, comprise a plurality or series of instructions to be executed by a processor in a hardware system, such as processor 802. Initially, the series of instructions are stored on a storage device, such as mass storage 820. However, the series of instructions can be stored on any suitable storage medium, such as a diskette, CD-ROM, ROM, etc. Furthermore, the series of instructions need not be stored locally, and could be received from a remote storage device, such as a server on a network, via network/communication interface 824. The instructions are copied from the storage device, such as mass storage 820, into memory 814 and then accessed and executed by processor 802. In alternate embodiments, the present invention is implemented in discrete hardware or firmware.

While FIG. 4 illustrates, for didactic purposes, the hardware architecture of a wireless client according to one implementation of the present invention, the present invention, however, can be implemented on a wide variety of computer system architectures, such as dual-mode cellular phones (e.g., cellular plus 802.11 capable devices), wireless VoIP phones, Personal Digital Assistants (e.g., converged devices which support WLAN data+voice and cellular), Laptop computers, and the like. An operating system manages and controls the operation of system 800, including the input and output of data to and from software applications (not shown). The operating system provides an interface, such as a graphical user interface (GUI), between the user and the software applications being executed on the system. According to one embodiment of the present invention, the operating system is the Windows® 95/98/NT/XP operating system and/or Windows® CE (WinCE) operating system, available from Microsoft Corporation of Redmond, Wash. However, the present invention may be used with other operating systems, such as the Apple Macintosh Operating System, available from Apple Computer Inc. of Cupertino, Calif., UNIX operating systems, LINUX operating systems, Symbian operating systems and the like.

C. Basic Network Environment for Data Collection and Diagnostics

Figure 5:
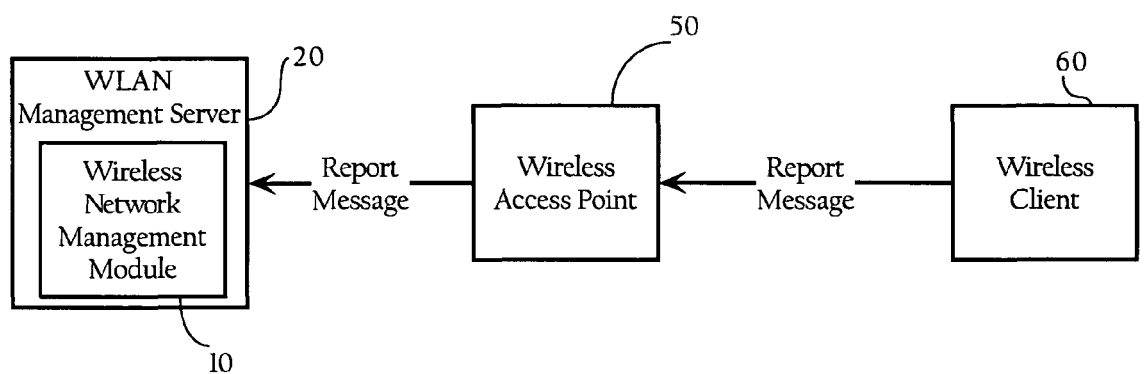
FIG. 5 is a network environment implementing a WLAN according to one implementation of the present invention.

FIG. 5 illustrates the flow of path metric information among a wireless client 60, a wireless access point 50 and a wireless network management module 10. For ease of illustration, only one wireless access point-50 and one wireless client 60 are shown. Implementations of the present invention described herein may involve multiple wireless access points and multiple wireless clients, as well as other intermediate systems between the wireless access points 50 and the wireless network management module 10 (such as wireless switches, wireless domain services (Cisco WDS) access points, etc.). In one implementation, wireless client 60 transmits uplink metrics in report messages to wireless access point 50, which transmits the downlink metrics and uplink metrics in report messages ultimately to the WLAN management module.

In accordance with the present invention, the wireless network management module 10 collects and analyzes uplink and downlink metric information for a plurality of wireless clients 60 in the WLAN. The wireless network management module 10, in one implementation, collects measurements involving real-time protocols, such as voice (e.g., VoIP using RTP/UDP/IP) and video, as well as many other types of information. As described in further detail below, the measurements provide information related to latency, queuing delay, jitter, packet loss, roaming delay, and roaming count, which provide data for comprehensive diagnostics as compared to measurements taken merely at one point in an end-to-end connection.

D. Data Collection

D.1. Data Collection at Wireless Client

D.1.a. Latency, Queuing Delay, Packet Loss Rate, and Packet Count

The following describes how a wireless client collects uplink metrics according to one implementation of the invention. Latency is defined as the time required for a packet to traverse the WLAN and is measured by either a wireless client, or a wireless access point, from the time a packet is enqueued at the Medium Access Control (MAC) layer until the time the packet has been successfully transmitted over the WLAN (as determined by receiving an acknowledgment frame from the receiver). Latency, in one implementation, includes intervening Layer 2 retries if they are needed, as an 802.11 transmitter may transmit a packet several times until the recipient node acknowledges the packet or until there is a time out. Jitter is the variation of latency and is measured based on a sequence of packet transmissions. In one implementation, jitter can be computed based on the values of a latency histogram maintained by the wireless client 50 (see below). Latency may also be computed in other manners. For example, the transmitting nodes may add a time stamp to the packet before transmission. The receiving station (whose clock is synchronized to that of the transmitter) checks its clock when the packet is successfully received, and subtracts the two to determine latency. This implementation can be used to overcome possible problems due to lost acknowledgments (i.e., where the receiving station correctly receives the packets, transmits an ACK back, but the original transmitter (now in receive mode waiting for the ACK) does not correctly receive the ACK). When the ACK frame is lost, the transmitter re-transmits the packet, which may add latency to the metric even though the receiver correctly received the packet. The receiver will recognize the duplicate transmission and discard the packet; however, it still sends back an ACK, knowing that the transmitter must not have received its first ACK).]

Packet loss rate (PLR) is the rate at which packets are dropped. Packets are typically dropped, after a threshold number of re-transmission attempts, due to excessive collisions or physical layer (PHY) errors. PLR is calculated as the number of packets dropped divided by the packet count during the measurement interval. Packet count is a count of the number of packets enqueued and attempted to be transmitted at the MAC layer during the measurement interval (note that not all attempts may be successful—some frames may be discarded if too many Layer 2 retries are needed). In some implementations, packet count is tracked, because not all voice and video codecs supply packets at a constant rate (e.g., voice activity detection (VAD) which does not transmit a packet when the speaker is silent). Note that these three metrics are factors that can impact quality of service (QoS) over the WLAN, and are, consequently, factors that can influence VoIP or other real-time media application performance.

Figure 6:
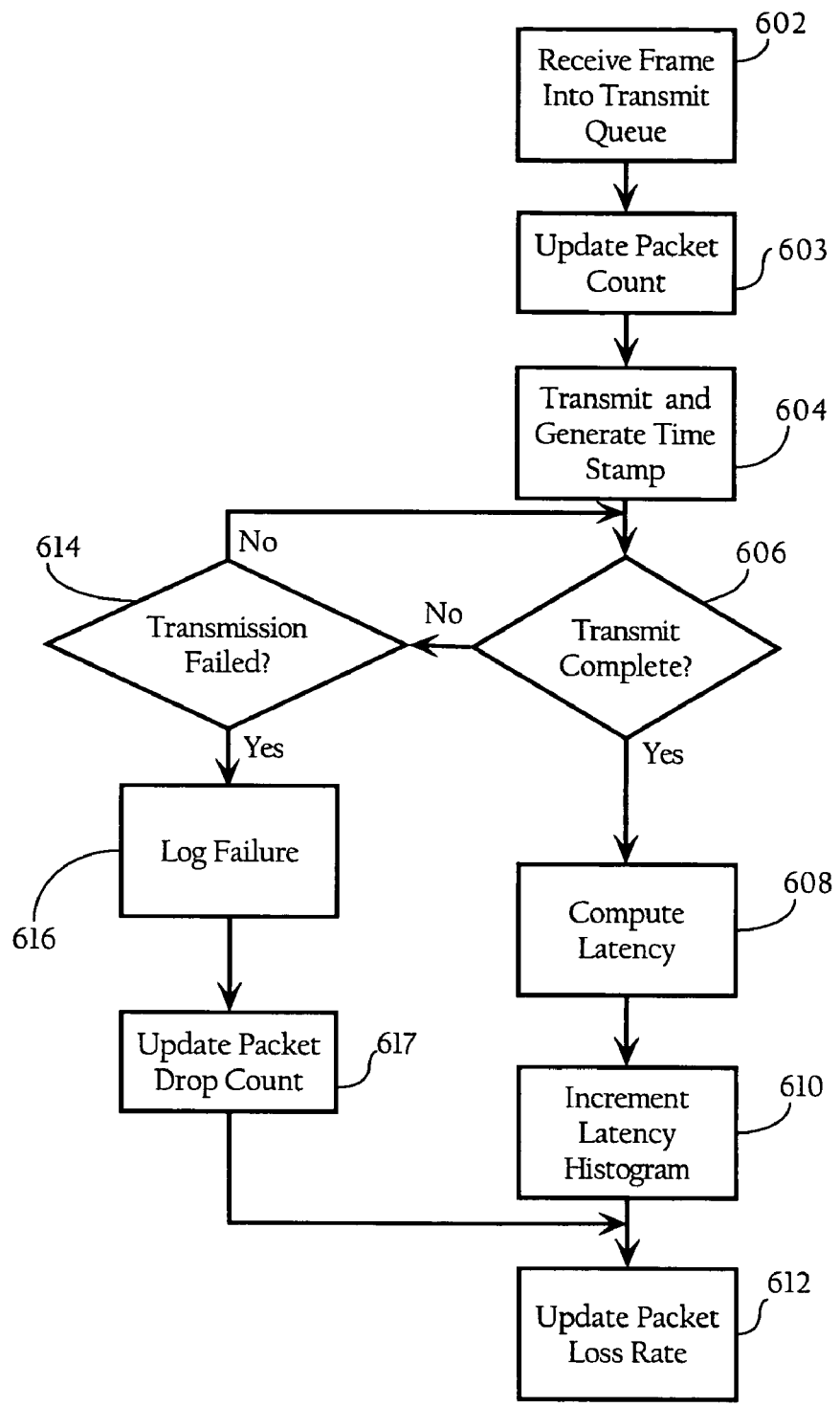
FIG. 6 is a flow chart illustrating a process flow, according to one implementation of the present invention, associated with data collection.

FIG. 6 is a flow chart illustrating a process flow, according to one implementation of the present invention, associated with uplink metric data collection. In one implementation, wireless client 60 is configured to apply the traffic stream metric collection functionality described herein only to streaming or real-time protocol traffic, such as voice, video and the like. Detection of the streams can be based on a variety of factors, such as attributes of the frames (e.g., protocol type, UDP source and destination ports, and IP source and destination addresses), use of a particular transmit queue (e.g., AC_VO or AC_VI), and calls made to the network interface driver of the wireless client. Referring to FIGS. 5 and 6 together, the wireless client 60 receives a frame into a transmit queue (602). The wireless client 60 time stamps the frame upon transmitting the frame to the wireless access point 50 (604). The wireless client 60 then updates the packet count (603). If the transmission is successful (606), the wireless client 60 computes the latency based on the current time (i.e., the time the wireless client 60 receives an acknowledgment from the wireless access point) and the time stamp (608). In one implementation, the uplink metric information is monitored by a process running separately from the data transmission and receipt functions implemented on wireless client. The application driver code implementing the transmission and receipt functions can include programming hooks that alert the uplink metric collection process when the transmission of a frame has succeeded (e.g., generally, when an acknowledgment frame has been received). In other implementations, the uplink metric measurement process can be configured to monitor the state of various parameters and variables maintained by the transmission and receipt processes. This helps to ensure that the wireless network is operating with correct operational parameters vis a vis QoS (i.e., lack of any alarms). The wireless client 60 then updates (i.e., increments) a latency histogram (610) based on the observed latency and the latency intervals maintained by the histogram. In one implementation, the latency histogram maintains a count for a plurality of latency intervals (e.g., less than 10 milliseconds, 10 to 20 milliseconds, 20 to 30 milliseconds and over 30 milliseconds). Of course, the histogram can be configured with alternative latency intervals or a greater or lesser number of histogram bins. In one implementation, the transmission fails (606) if the wireless client 60 resends the frame a predetermined number of times without receiving an acknowledgment from the wireless access point 50 or after a predetermined amount of time (i.e., a time out). If the transmission fails (614), the failure is logged (616) and the packet drop counter is incremented (617). The wireless client then updates the packet loss rate (612).

Metrics allowing for determination of average queuing delay may also be maintained. Queuing delay, in one implementation, is measured from the time a wireless frame is enqueued in the transmit queue until the time the transmission actually starts. This is different than transmission delay since it differentiates the fact that interference can prevent a transmission from starting (thereby adding to queuing delay), whereas a long average transmission delay can be caused by interference preventing the start of transmission, retries caused by collisions, or a combination thereof. This distinction can facilitate the troubleshooting process since the remedies for resolving foreign interference are different than for resolving excessive collisions. To compute average queuing delay, a receive time stamp can be generated at the time the wireless frames are read onto the transmit queue at step 602 in FIG. 6. In such an embodiment, the time stamp generated in step 604 can be considered a receive time stamp. Queuing delay for the frame can then be computed, in one implementation, after transmission of the frame (e.g., during step 608, for example) by computing the difference between the transmit and receive time stamps. Still further, both the wireless client and the access point can maintain a queuing delay histogram in a manner similar to the latency histogram described herein to allow for a determination of average queuing delays observed in the network.

D.1.b. Roam Time and Roam Count

Roaming count is defined as the number of successful roams (i.e., re-associations to a new wireless access point) during a measurement interval. Roaming may cause a second type of impairment, which may be induced by the WLAN. When a wireless client roams to a new wireless access point during a call, transmission of voice packets may be temporarily disrupted. If the length of the disruption is very short (e.g., 60 ms or less), the end user may not hear or otherwise notice that a roam event occurred. However, if the disruption is long, the end user will typically notice a gap in the audio stream. Such gaps may manifest themselves to the end user as short "clicks" or "pops," or periods of up to several seconds of silence. In order to facilitate detection of this impairment, in one implementation, the wireless client measures roaming time and roaming count. Note that other sections of the WLAN infrastructure (e.g., a wireless access point) could also make these measurements, but it is generally easier for the wireless client to make them. These client-generated measurements are reported to the wireless access point, which in turn reports them to the wireless network management module 10. Roaming time, in one implementation, is measured based on the time between the last downstream packet received from the previous wireless access point and the first downstream packet received from the new wireless access point. Similar to latency, roam time can be tracked with a roam time histogram. In other implementations, a separate roam event record including the roam time, and the MAC addresses of the new and previous access points is recorded after each roam event.

Alternatively, roaming time could be measured in a similar manner based on the transmission of upstream packets to the previous and new wireless access points. The alternative measurement may be used if unidirectional traffic streams are being transported by the WLAN or if downlink packets are temporarily unavailable. During voice activity detection (VAD), the end user on the distant phone may not be talking and therefore that endpoint may not be transmitting packets. Downlink measurements are generally superior because they can measure the effects of some impairments not observable with uplink measurements (e.g., LAN switch forwarding table update delays). Since packets are not traversing the WLAN during a roam event, there are no measurements that can be made for latency, jitter, or PLR during a roam. However, this is inconsequential since roaming time and roaming count measurements are being made instead during a roam.

Figure 7:
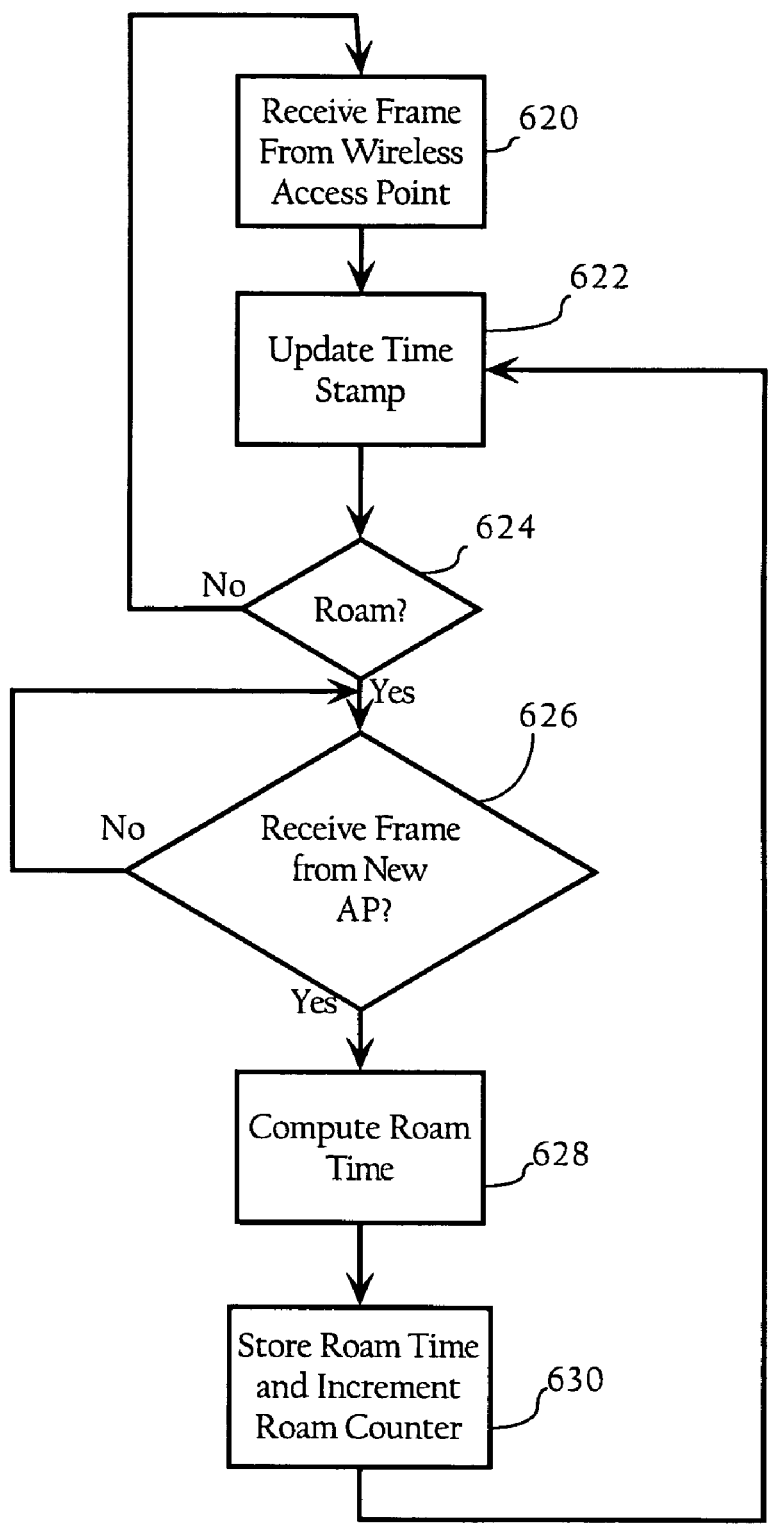
FIG. 7 is a flow chart illustrating a process flow, according to one implementation of the present invention, implemented at a wireless client.

FIG. 7 is a flow chart illustrating a process flow, according to one implementation of the present invention, implemented at the wireless client 60. As FIG. 7 shows, as the wireless client 60 receives downstream frames from a wireless access point (620), it updates a time stamp (622). If the wireless client 60 enters a roaming state (624), the wireless client 60 monitors for receipt of a frame from another wireless access point (626). After the roam, the wireless client 60 then computes the roam time (628). In one implementation, the roam time is based on the time stamp of the last frame received from the previous wireless access point and the time stamp of the first frame received from the current wireless access point. The wireless client then stores the roam time and increments a roam counter (630).

D.1.c. Metric Report Messages

Figure 8:
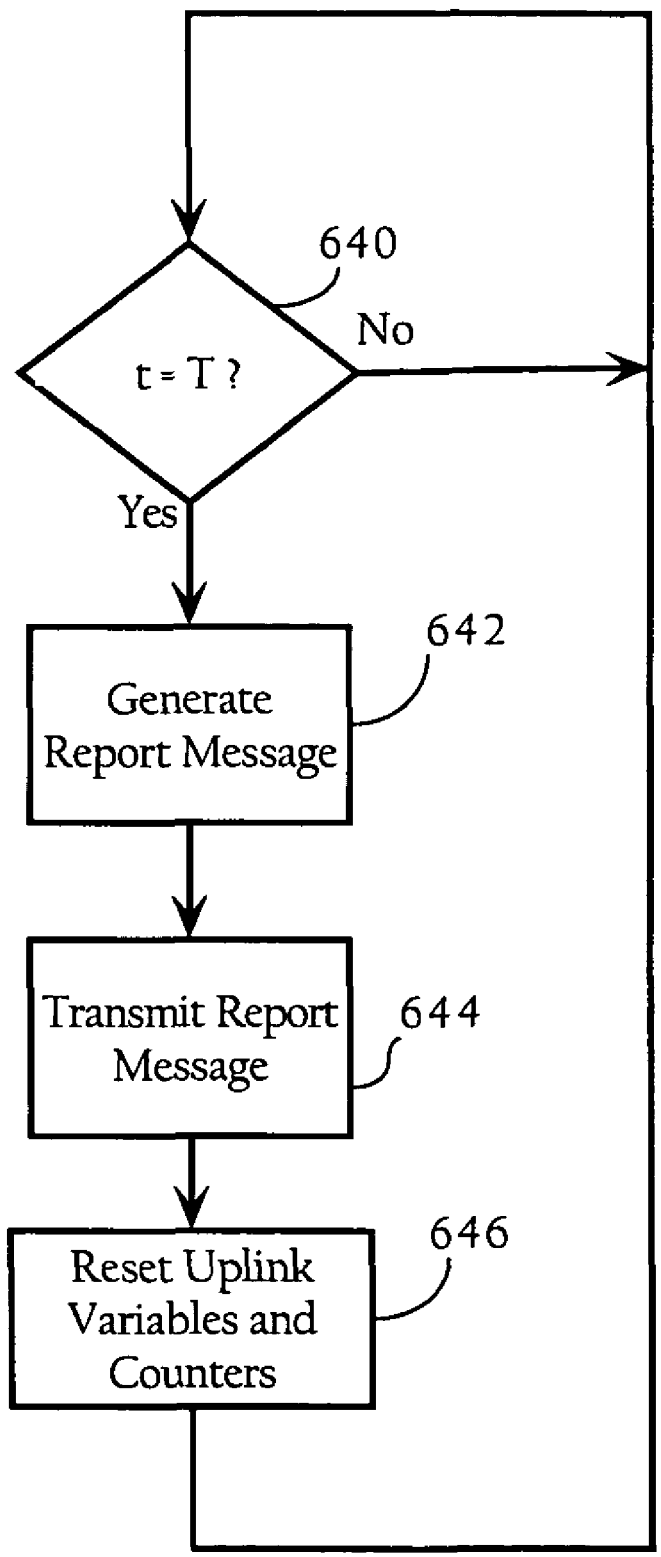
FIG. 8 is a flow chart illustrating a process flow, according to one implementation of the present invention, implemented at a wireless client.

FIG. 8 is a flow chart illustrating a process flow, according to one implementation of the present invention, implemented at the wireless client 60. Referring to FIGS. 5 and 8 together, every T seconds (e.g., every 5 seconds) (640), the wireless client 60 generates a report message (642), which includes uplink metric data, such as latency, packet loss rate, packet count, roam time, and roam count, collected during the measurement interval. In one implementation, the report messages may also include a time stamp to allow a data collection process to correlate the report messages on a temporal basis. As FIG. 8 illustrates, the wireless client 60 transmits the report message to the wireless access point 50 (644), and resets the uplink measurement variables and counters (646).

D.2. Data Collection at Wireless Access Point

In a manner similar to wireless client 60, wireless access point 50 measures and collects downlink metrics including latency, queuing delay, jitter, packet loss rate, and packet count. As described above in section D.1.a., wireless access point 50 measures latency based on the time difference between transmission of a downstream packet and receipt of a corresponding acknowledgment. The resulting latency is stored in a latency histogram corresponding to the wireless client. In one implementation, wireless access point 50 maintains a latency histogram table including an entry for each wireless client 50 with which the wireless access point 50 is associated. Wireless access point 50 may also maintain a queuing delay histogram as discussed above. Wireless access point 50 may also measure and collect additional downlink metrics such as packet loss rate and packet count in connection with respective wireless clients 50. Still further, as discussed below, wireless access point 50 also receives report messages including uplink metrics measured by the wireless clients 60, and updates one or more data structures based on the received uplink metrics.

Figure 9:
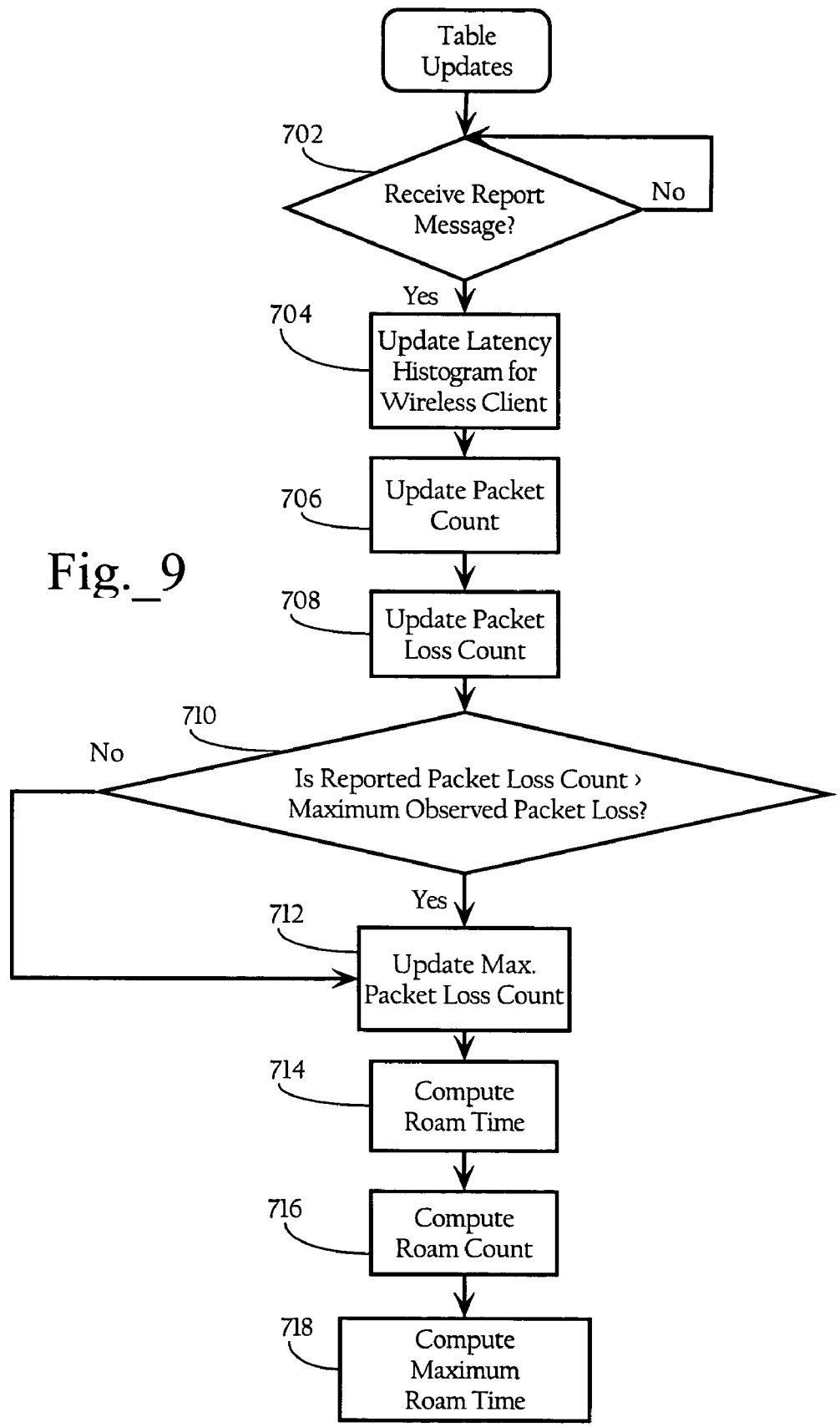
FIG. 9 is a flow chart illustrating a process flow, according to one implementation of the present invention, implemented at a wireless access point.

FIG. 9 is a flow chart illustrating a process flow, according to one implementation of the present invention, implemented at the wireless access point 50. Referring to FIGS. 5 and 9 together, the wireless access point 50 receives the report message (e.g., the 5-second report) from the wireless client 60 (702) and then increments a latency histogram for the wireless client 60 (704). In one implementation, wireless access point 50 maintains, for each wireless client, separate latency and queuing delay histograms for the uplink and downlink latencies. In another implementation, wireless access point 50 maintains a single latency histogram (and queuing delay histogram) for each wireless client that maintains both the uplink and downlink metrics. As FIG. 9 illustrates, when wireless access point 50 receives a report message from a wireless client (702), it updates the latency histogram for the wireless client based on the latency histogram values in the report message (704). For example, the wireless access point 50 adds the value for a given latency interval in the report message to the existing value corresponding to the latency interval in the histogram maintained by the wireless access point 50. The wireless access point 50 then updates the packet count (706), updates the packet loss counter (708) based on the packet losses indicated by the report. The wireless access point 50 then determines if the reported packet loss count is greater than the maximum previously-observed packet loss (710), and if so, the wireless access point 50 then updates the maximum packet loss counter (712). The wireless access point 50 then updates the roam time (714), the roam count (716), and the maximum roam time (718.

Similar to the process flow described in FIG. 8 for the wireless client, the wireless access point transmits report messages to an upstream node (e.g., WLAN management server 20) at an interval T (e.g., 90 seconds). The report messages include the uplink and downlink metric information for one or more of the wireless clients 60 associated with the wireless access point. In one implementation, a time stamp can be generated and included in the report message.

D.3. Data Collection at WLAN Management Server

Figure 10:
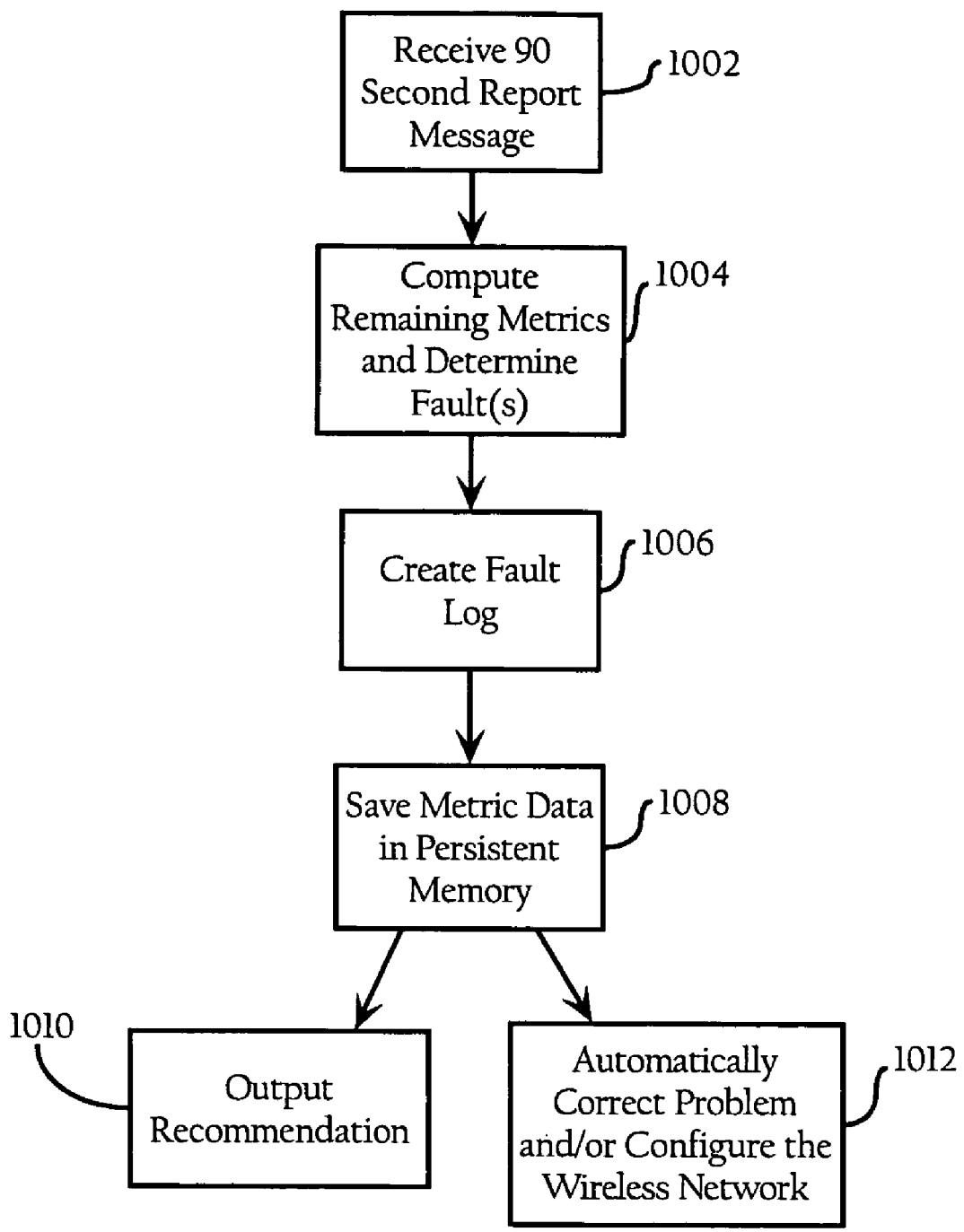
FIG. 10 is a flow chart illustrating a process flow, according to one implementation of the present invention, implemented at a WLAN management server.

FIG. 10 is a flow chart illustrating a process flow, according to one implementation of the present invention, implemented by WLAN management module 10. As discussed above, referring to FIGS. 5 and 10 together, the wireless network management module 10 receives a report message from the wireless access point 50 (1002). The wireless network management module 10 then computes remaining metrics, if any, from the metric data in the report message and then determines faults based on the metrics (1004). As discussed above, wireless network management module 10, using the latency histogram for a given wireless client, may compute observed jitter. Faults are determined, in one implementation, by comparing one or more metric values (either on a per-client or aggregate basis) to corresponding threshold values. The traffic stream metrics may be low values. For example, observed latency may only be a few milliseconds and the PLR may be very close to zero. However, if an impairment on the WLAN occurs, one or more of these parameters may cross a threshold value, thereby triggering a fault. For example, if interference is encountered by a wireless access point or wireless client, latency, jitter, and packet loss rate may increase. When these metrics are reported to the wireless network management module 10, it is able to observe that the link between the wireless access point and wireless client is impaired.

The wireless network management module 10 creates a fault log if a fault is detected (1006). In one implementation, the wireless network management module 10 may mark a report from the wireless access point for deletion or mark the report to be saved to persistent memory (1008). In one implementation, the report is marked for deletion if the report contains no faults or if the faults are minimal (i.e., below a predetermined threshold). In another implementation, the report messages are stored in a persistent data store to allow for the generation of various performance reports.

After the fault log is created, the wireless network management module 10 can then take remedial action based on a fault policy. For example, as described in further detail below in FIG. 11, the wireless network management module 10 may output a recommendation (1010) and/or automatically perform remedial measures to correct the problem and/or configures the wireless network, if permissible (1012). In one implementation, the wireless network management module 10 may generate and output a summary of metrics for a system administrator to view. In one implementation, the recommendation may be a recommendation for a corrective action. In one implementation, the recommendation may include information for a network administrator, enabling him/her to further diagnose problems in the WLAN. For example, such information may be an ID of the particular wireless access point that provided a given report. Because metrics are based on reports from a particular wireless access point and since the wireless network management module 10 knows where the wireless access point is physically located, the problem is physically localized (i.e., to a particular area of a building). So, for example, a network administrator could attempt to troubleshoot the symptoms by re-site surveying the affected location, searching for interference using a spectrum analyzer (or other tool) or other method appropriate to the deployment. In addition, the operations associated with detecting faults and working through the fault tree, below, can be triggered upon receipt of a report message from an access point or other node, based on a configured periodic interval, or on demand in response to a command from a network administrator.

E. WLAN Diagnostics—Fault Tree

In VoIP systems and in particular VoWLAN systems, there are many points in the network that can cause audio impairments to end users. For example, as discussed further below, there may be congestion or interference on the WLAN or there may be congestion on the WAN connection. There may be networking equipment that is misconfigured or has latent bugs, which impairs the audio. For VoWLAN calls there is added complexity which arises from user mobility. In one implementation of the present invention, a fault tree is used to facilitate isolation or diagnosis of a given problem within the WLAN.

Figure 11:
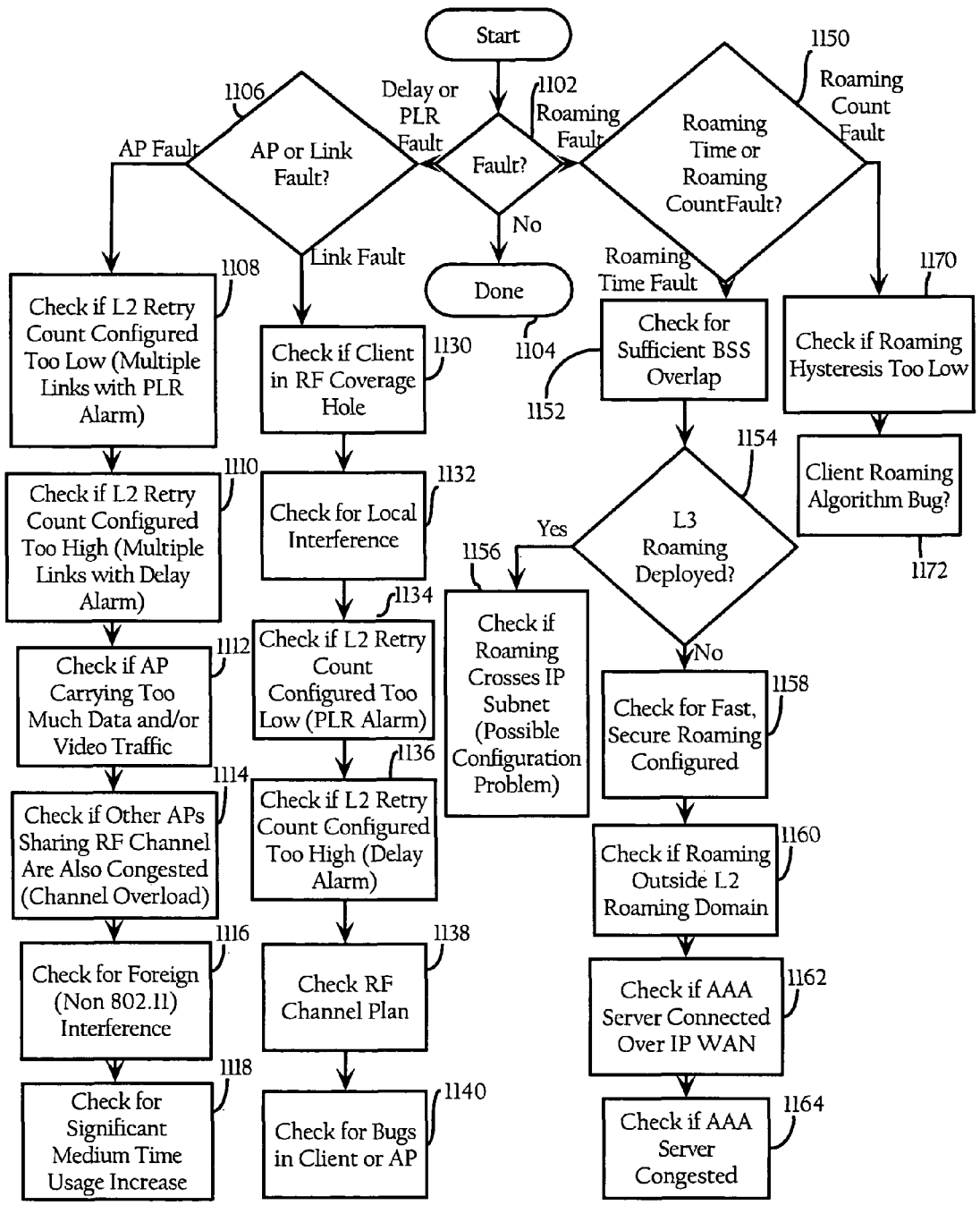
FIG. 11 is a flow chart illustrating a process flow, according to one implementation of the present invention, implemented at a WLAN management server.

FIG. 11 is a flow chart illustrating a process flow, according to one implementation of the present invention, implemented at the WLAN management server 20. The fault tree described below is not intended to be an exhaustive guide to problem diagnosis. Rather, the fault tree set forth in FIG. 11 is intended to illustrate how analysis of traffic stream metrics may be used in accordance with one embodiment of the present invention.

In one implementation, the wireless network management module 10 first determines if the fault was caused by the WLAN as distinguished from a fault that may have been caused by a wired network. As describe in further detail below, the fault was caused by the WLAN if there is a latency, packet loss, or roaming fault (1102). To determine whether the fault is a latency, PLR, and/or roaming fault, and hence caused by the WLAN, the latency, PLR, and roaming metrics that wireless network management module 10 receives from wireless access point 50 are compared to threshold values. If the fault does not appear to be associated with the WLAN, the process ends (1104).

E.1. Latency or Packet Loss Rate Faults

If the fault is based on a latency or PLR metric, the wireless network management module 10 determines, more specifically, whether the wireless access point caused the fault or if the fault is a link fault (1106).

E.1.a. Wireless Access Point

A wireless access point fault indicates that multiple link faults were reported for a given wireless access point. The wireless network management module 10 checks if the wireless access point L2 retry count setting is too low (1108). In one implementation, a PLR alarm indicates this. The wireless network management module 10 then checks if the wireless access point L2 retry count setting is too high (1110). In one implementation, a delay alarm indicates this. Note that while the "checking" steps such as the checking step 1108 and others described below may be automatically executed actions, such checks may alternatively be recommendations that the management module 10 generates and communicates to a user, such a system administrator. In some implementations, certain checks can be made by transmitting SNMP queries to one or more wireless access points, while other checks can be made by further analyzing or processing collected traffic stream metrics.

The wireless network management module 10 then checks if the wireless access point is carrying too much data and/or video traffic (1112). There may be too much best-effort data traffic going through the network (802.11e/WMM EDCA only provides statistical priority for the voice queue, not strict priority). In this case, the admission control algorithms may be admitting too much traffic or be otherwise mis-configured (e.g., disabled). This can be checked by observing the amount of traffic going through the various queues. One remedy is for the wireless network management module 10 to reduce the percentage of the channel that may be used by services (e.g., QoS services, video services, voice services, etc.). Another remedy is for the wireless network management module 10 to increase the minimum contention window size setting (CW-min) or the arbitration interframe space (AIFS) for the best-effort and background data queues at the wireless access point.

The wireless network management module 10 checks if there are other wireless access points sharing the same RF channel (802.11 interference) (1114), which may be causing congestion. The admission control threshold may be set too high (allowing too many calls). This may be corroborated by checking the channel utilization and call count (current number of calls carried by the wireless access point on the serving wireless access point and co-channel wireless access points). One remedial measure is for the wireless network management module 10 to lower the transmit power of these wireless access points so that they contend less with each other. A malicious or rogue wireless client may be using incorrect EDCA parameters (e.g., BE data sent using voice queue access parameters). If this is the case, then the admission control algorithm will likely not be accounting for the traffic correctly. Another remedy would be for the wireless network management module 10 to check if all associated wireless clients are bona-fide users and have a valid software load. Another issue is that the co-channel interference may be coming from an un-managed wireless access point (such as a rogue wireless access point or wireless access points in another office of a multiple tenant unit). The admission control algorithm may need to be re-configured to reduce the number of calls accepted by the wireless access point to account for this situation. Another remedy is for the wireless network management module 10 to reduce the Clear Channel Assessment (CCA) and Start of Packet (SOP) sensitivity of both the wireless access point and wireless clients wireless PHYs. This mitigates the capacity reducing effects of co-channel interference.

CCA is a function that indicates to the MAC when the RF channel (i.e., medium) is idle and thus available for transmission. Some implementations use a threshold comparison method for CCA. With threshold comparison, the current power detected by the receiver is compared to a threshold level. If the current power is greater than or equal to the threshold, which is typically the case when another station is transmitting, the medium is determined to be busy; if the current received power is less than the threshold, the medium is determined to be idle. By reducing the CCA sensitivity, the threshold is increased thereby allowing the medium to be determined to be idle even though distant stations may be transmitting. This aids in reusing the channel, and if done carefully, does not create problems since in many cases a CCA detector is more sensitive than the receiver's ability to demodulate the received transmission.

SOP is a function in a receiver that initiates overall receiver operation due to detection of a packet transmission from another station. In some cases, an SOP algorithm will initiate overall receiver operation even though there is insufficient received power to correctly demodulate the packet. This is due to the fact that SOP detection is more sensitive than the receiver's ability to demodulate another station's transmission. By making the SOP algorithm less sensitive, the receiver becomes more immune to co-channel interference.

The wireless network management module 10 then checks if there may be foreign interference (1116). One remedy is for the wireless network management module 10 to reduce the CCA and SOP sensitivity of both the wireless access point and wireless clients wireless PHYs. This mitigates the capacity reducing effects foreign interference. The wireless network management module 10 could check for foreign (non 802.11) interference from sources such as microwave ovens, cordless phones or possibly from interference outside the building.

The wireless network management module 10 then checks if some event, which may have occurred, has caused the medium time usage to significantly increase (1118). For example, if a number of wireless clients in a conference room are all in a coverage hole, they may be using much more medium time than usual (as all have shifted to a lower PHY rate). Overall, this may affect QoS.

E.1.b. Link Fault

An individual link fault indicates a fault on a single link between a given wireless client and wireless access point. If the fault is a link fault, the wireless network management module 10 checks if the wireless client is in an RF coverage hole (1130). If so, the wireless network management module 10 finds the physical location where this is a problem. This may require the use of an RF survey tool, RF coverage hole detection alarms, or reports. Another remedial measure may be to increase the corresponding wireless access point's transmitter power. If this is not possible, the wireless network management module 10 may provide a recommendation that an additional wireless access point be deployed to fill-in the coverage hole.

The wireless network management module 10 then checks for interference local to the wireless client, which may include foreign (non 802.11) interference from sources such as microwave ovens, cordless phones, or interference from outside the building (1132). The wireless network management module 10 then checks if the level 2 (L2) retry count setting is set too low (1134). In one implementation, PLR metric alarms indicate this. A PLR metric alarm could, for example, be triggered when a wireless client is near the edge of a wireless access point radio coverage area and is experiencing frequent packet loss. One remedial action is for the wireless network management module 10 to increase the L2 retries at the wireless access point and/or wireless client.

The wireless network management module 10 then checks if the L2 retry count setting is set too high (1136). In one implementation, delay alarms indicates this. A delay alarm could, for example, be triggered when a wireless client is near the edge of a wireless access point radio coverage area and is experiencing significantly more L2 retries in order to successfully transmit a packet. (The wireless access point is likely experiencing the same phenomenon). Such an excessive number of retries results in packets having greater delays. One remedial measure is for the wireless network management module 10 to increase the AP's transmitter power or recommend an additional AP be deployed to fill in needed coverage.

The wireless network management module 10 then checks the RF channel plan (1138). The wireless access point may be going off-channel from time to time to listen for rogue wireless access points or for other radio management purposes. When a wireless access point goes off-channel, a wireless client may drop packets, which will cause a PLR alarm. One remedial measure is for the wireless network management module 10 to adjust the alarm threshold, which may be too sensitive, or to configure the wireless access point to spend less time off-channel. If the fault occurs intermittently, it may be due to adjacent channel interference from a nearby wireless client or wireless access point. As such, one remedial measure is for the wireless network management module 10 to make adjustments to the RF channel plan. In one implementation, one adjustment may be to alter the RF channel assignments such that there is more than 1 intervening RF channel between neighboring wireless access points. (This is more easily accomplished in the 5-GHz band than in the 2.4-GHz band). Intermittent faults may indicate that the wireless client's roaming algorithm has not picked the best serving wireless access point. Once the wireless client, which is experiencing the fault moves away from the wireless client transmitting on the adjacent channel, the fault should disappear. The wireless network management module 10 then recommends to the system administrator to using a wireless or wired sniffer to check for bugs in the wireless access point or wireless client (1140).

E.2. Roaming Faults

Since users may roam between several wireless access points during the course of a call, an audio problem may only occur on certain wireless access points. For example, the audio problem may be caused by interference (e.g., a microwave oven) that is near only one of the wireless access points used during the call. In this situation, the end-user may not recognize that the audio problem only happens in certain areas of the building; the problem appears to the end-user as intermittent. Thus it may be difficult for a network administrator to determine the root cause of an end-user's complaint.

If the wireless network management module 10 detects that the roaming time is too long, it can report this to the network administrator as a WLAN impairment. Long roaming times can be caused by several different problems which the network administrator can troubleshoot.

Remedial action may include re-site surveying (to diagnose whether the roaming delay is caused by lack of radio coverage) and sniffing packets on the wired LAN to determine if infrastructure equipment is not responding quickly enough to support a fast roam. For example, a security server needed for re-association may be overloaded or LAN switches may not be updating their forwarding tables quickly enough.

Finally, roaming count can also be used to diagnose audio problems related to roaming. Typically a voice handset will only roam slowly (say no faster than every 5-10 seconds), depending on how quickly the end user is walking (or running) around the building. However, in some cases voice handsets may "ping pong" quickly between two wireless access points. If this happens, many packets may be lost during the roams resulting in intermittent audio to the end user. If the roaming count reported to the radio management system is higher than a defined threshold, then remedial action may be taken by the network administrator.

E.2.a. Roaming Time Fault

Referring again to FIG. 11, if the wireless network management module 10 determines that a roaming fault is a roaming time fault, the wireless network management module 10 checks for insufficient basic service set (BSS) RF overlap (1152). This means that the wireless client has reached the edge of coverage on one BSS and has not found sufficient radio coverage from a neighboring BSS to maintain adequate link performance. As noted above, "checking" steps described herein may be recommendations that the management module 10 generates and communicates to a user. Alternatively, such steps may be automatically executed policy actions. For example, the checking step 1152 may involve automatically increasing the transmit power of one or more wired access points or automatically re-running a channel assignment or transmit power algorithm, etc. If the deployment is configured for L3 roaming, the wireless network management module 10 checks the configuration (1154). The wireless network management module 10 then checks if the roaming fault occurred when the wireless client traversed the L3 subnet boundary (1156). If so, it may indicate a LAN switch misconfiguration. If the deployment is not configured for L2 roaming, the wireless network management module 10 checks whether Fast Secure Roaming is configured (1158). If not, the wireless network management module 10 checks if the an authentication server is connected locally or over the WLAN (1162) and if the authentication server is experiencing congestion (1164). If Fast Secure Roaming is configured, the wireless network management module 10 checks a sniff-wired LAN to check for a LAN Switch forwarding table update rate problem.

E.2.b. Roaming Count Fault

If the wireless network management module 10 determines that the fault is a roaming count fault, the wireless network management module 10 checks if there are many wireless clients exhibiting ping-pong roaming (roaming between 2 or more wireless access points too quickly) behavior in the BSS (1170). If so, the roaming hysteresis (an RF parameter) could be increased for this wireless access point (or set of adjacent wireless access points). Note that increasing the roaming hysteresis would mean the handset would need to measure a greater differential in received signal power between two different wireless access points before the wireless client roamed. The wireless network management module 10 then checks if the behavior is specific to one vendor's radio (1172). If so, a possible roaming bug may be the root cause.

Although the present invention disclosed herein is described in the context of latency, queuing delay, PLR, and roaming faults, the present invention may apply to other metrics, and still remain within the spirit and scope of the present invention. The present invention has been explained with reference to specific embodiments. For example, while embodiments of the present invention have been described as operating in connection with IEEE 802.11 networks, the present invention can be used in connection with any WLAN environment. Other embodiments will be evident to those of ordinary skill in the art. It is therefore not intended that the present invention be limited except as indicated by the appended claims.

What is claimed is:

1. A wireless client operative to communicate with a wireless access point in a wireless network, the wireless client comprising:
   one or more processors;
   a memory;
   a network interface; and
   a wireless network driver application, physically stored in the memory, comprising instructions that, when executed by the one or more processors, cause the wireless client to:
      monitor transmission of one or more frames between the wireless client and a wireless access point at a Medium Access Control (MAC) layer;
      collect uplink metric data based on the transmission of the one or more frames the uplink metric data comprising one or more uplink latencies of the one or more frames;
      construct an uplink latency histogram that comprises a count for each of a plurality of defined latency intervals using the one or more uplink latencies, comprising:
         maintaining counts of respective numbers of the one or more uplink latencies that fall within each of the plurality of defined latency intervals;
      generate a report message including the uplink latency histogram and at least some of the uplink metric data; and
      transmit the report message to the wireless access point.

2. The wireless client of claim 1, wherein the uplink metric data further comprises one or more of latency, queuing delay, packet loss rate, packet count, roam count, and roam time.

3. The wireless client of claim 2, wherein, to collect latency data, the wireless network driver application further comprises instructions that, when executed by the one or more processors, cause the wireless client to:
   receive a frame in a transmit queue;
   transmit the frame to the wireless access point;
   generate a time stamp for the frame;
   receive, from the wireless access point, an acknowledgment;
   compute the latency data based on the difference between the arrival time of the acknowledgment and the generated time stamp; and
   increment the count in the latency histogram for the latency interval in which the computed latency data belongs.

4. The wireless client of claim 3 wherein, to collect packet loss rate data, the wireless network driver application further comprises instructions that, when executed by the one or more processors, cause the wireless client to:
   detect transmission failures between the wireless client and the wireless access point;
   if a transmission failure occurs, log the transmission failure; and
   store packet loss rate data.

5. The wireless client of claim 2 wherein, to collect roam time data, the wireless network driver application further comprises instructions that, when executed by the one or more processors, cause the wireless client to:
   upon initiation of a roam event from a first wireless access point to a second wireless access point, detect the time difference between receipt of the last frame from the first wireless access point and receipt of the first frame from the second access point to compute a roam time.

6. In a wireless client operative to communicate with a wireless access point in a wireless network, a method comprising:
   monitoring transmission of one or more frames between the wireless client and a wireless access point at a Medium Access Control (MAC) layer;
   collecting uplink metric data based on the transmission of the one or more frames the uplink metric data comprising one or more uplink latencies of the one or more frames;

constructing an uplink latency histogram that comprises a count for each of a plurality of defined latency intervals using the one or more uplink latencies, comprising:
  maintaining counts of respective numbers of the one or more uplink latencies that fall within each of the plurality of defined latency intervals;
generating a report message including the uplink latency histogram and at least some of the uplink metric data; and
transmitting the report message to the wireless access point.

7. The method of claim 6, wherein the uplink metric data further comprises one or more of latency, queuing delay, packet loss rate, packet count, roam count, and roam time.

8. The method of claim 7, wherein collecting latency data further comprises:
  receiving a frame in a transmit queue;
  transmitting the frame to the wireless access point;
  generating a time stamp for the frame;
  receiving, from the wireless access point, an acknowledgment;
  computing the latency data based on the difference between the arrival time of the acknowledgment and the generated time stamp; and
  incrementing the count in the latency histogram for the latency interval in which the computed latency data belongs.

9. The method of claim 8 wherein collecting packet loss rate data further comprises:
  detecting transmission failures between the wireless client and the wireless access point; and
  if a transmission failure occurs, logging the transmission failure; and
  storing packet loss rate data.

10. The method of claim 7 wherein collecting roam time data further comprises:
  upon initiation of a roam event from a first wireless access point to a second wireless access point, detecting the time difference between receipt of the last frame from the first wireless access point and receipt of the first frame from the second access point to compute a roam time.

11. A wireless client operative to communicate with a wireless access point in a wireless network, the wireless client comprising:
  means for monitoring transmission of one or more frames between the wireless client and a wireless access point at a Medium Access Control (MAC) layer;
  means for collecting uplink metric data based on the transmission of the one or more frames the uplink metric data comprising one or more uplink latencies of the one or more frames;
  means for constructing an uplink latency histogram that comprises a count for each of a plurality of defined latency intervals using the one or more uplink latencies, comprising:
    means for maintaining counts of respective numbers of the one or more uplink latencies that fall within each of the plurality of defined latency intervals;
  means for generating a report message including the uplink latency histogram and at least some of the uplink metric data; and
  means for transmitting the report message to the wireless access point.

12. A wireless access point operative to wirelessly communicate with a wireless client and to communicate with a wireless network management server in a wireless network, the wireless access point comprising:
  one or more wireless network interfaces for communication with one or more wireless clients;
  one or more processors;
  a memory;
  a network interface; and
  a wireless access point application, physically stored in the memory, comprising instructions that, when executed by the one or more processors, cause the wireless access point to:
    receive from the wireless client a plurality of reports, each of the plurality of reports comprising an uplink latency histogram and uplink metric data, wherein the uplink latency histogram comprises a plurality of counts corresponding to a plurality of latency intervals, wherein each of the plurality of counts indicates a number of uplink latencies that fall within one of the plurality of latency intervals;
    aggregate the uplink latency histograms and the uplink metric data in the plurality of reports; and
    transmit, from the wireless access point to the wireless network management server, a report comprising the aggregated uplink latency histogram and uplink metric data.

13. The wireless access point of claim 12 wherein the wireless access point application further comprises instructions that, when executed by the one or more processors, cause the wireless access point to:
  update a packet loss counter; and
  update a maximum packet loss counter.

14. The wireless access point of claim 12 wherein the wireless access point application further comprises instructions that, when executed by the one or more processors, cause the wireless access point to:
  monitor transmission of one or more frames between the wireless access point and the wireless client;
  collect downlink metric data based on the transmission of the one or more frames, the downlink metric data comprising one or more downlink latencies of the one or more frames;
  construct a downlink latency histogram that comprises a count for each of a plurality of latency intervals using the one or more downlink latencies; and
  transmit, to the wireless network management server, a report comprising the downlink latency histogram and at least some of the downlink metric data.

15. The wireless access point of claim 14 wherein the downlink metric data comprises one or more of observed latency, observed queuing delay, observed packet loss rate, and packet drop count.

16. In a wireless access point operative to wirelessly communicate with a wireless client and to communicate with a wireless network management server in a wireless network, a method comprising:
  receiving from the wireless client a plurality of report, each of the plurality of reports comprising an uplink latency histogram and uplink metric data, wherein the uplink latency histogram comprises a plurality of counts corresponding to a plurality of latency intervals, wherein each of the plurality of counts indicates a number of uplink latencies that fall within one of the plurality of latency intervals;
  aggregating the uplink latency histograms and the uplink metric data in the plurality of reports; and transmitting, from the wireless access point to the wireless network management server, a report comprising the aggregated uplink latency histogram and uplink metric data.

17. The method of claim 16 further comprising:
updating a packet loss counter; and
updating a maximum packet loss counter.

18. The method of claim 16 further comprising:
monitoring transmission of one or more frames between the wireless access point and the wireless client;
collecting downlink metric data based on the transmission of the one or more frames, the downlink metric data comprising one or more downlink latencies of the one or more frames;
constructing a downlink latency histogram that comprises a count for each of a plurality of latency intervals using the one or more downlink latencies; and
transmitting, to the wireless network management server, a report comprising the downlink latency histogram and at least some of the downlink metric data.

19. The method of claim 18 wherein the downlink metric data comprises one or more of observed latency, observed queuing delay, observed packet loss rate, and packet drop count.

20. A wireless access point operative to wirelessly communicate with a wireless client and to communication with a wireless network management server in a wireless network, the wireless access point comprising:
means for receiving from the wireless client a plurality of reports, each of the plurality of reports comprising an uplink latency histogram and uplink metric data, wherein the uplink latency histogram comprises a plurality of counts corresponding to a plurality of latency intervals, wherein each of the plurality of counts indicates a number of uplink latencies that fall within one of the plurality of latency intervals;
means for aggregating the uplink latency histograms and the uplink metric data in the plurality of reports; and
means for transmitting, from the wireless access point to the wireless network management server, a report comprising the aggregated uplink latency histogram and uplink metric data.

21. A wireless network management server operative to communicate with a wireless access point in a wireless network, the wireless network management server comprising:
one or more processors;
a memory;
a network interface; and
a management application, physically stored in the memory, comprising instructions that, when executed by the one or more processors, cause the wireless network management server to:
receive a report message comprising an uplink latency histogram or a downlink histogram and at least one of uplink and downlink metric data generated by one or more nodes of a wireless network;
analyze the report messages to determine at least one metric or fault associated with the wireless network, comprising compute jitter using the uplink latency histogram or the downlink histogram; and
construct a fault flowchart for the wireless network based on the analysis, wherein for each of the at least one fault determined during the analysis to be associated with the wireless network, the fault flowchart indicates a type and a cause of the fault.

22. The wireless network management server of claim 21, wherein the management application further comprises instructions that, when executed by the one or more processors, cause the wireless network management server to:
isolate a problem to a wireless access point based on the downlink metric data.

23. The wireless network management server of claim 21, wherein the management application further comprises instructions that, when executed by the one or more processors, cause the wireless network management server to:
determine whether the wireless network is operating with correct operational parameters relative to quality of service (QoS).

24. The wireless network management server of claim 21, wherein the management application further comprises instructions that, when executed by the one or more processors, cause the wireless network management server to perform at least one of:
output a recommendation for one or more remedial measures; and
automatically perform at least one of the remedial measures.

25. The wireless network management server of claim 24, wherein the recommendation comprises information for a network administrator, and wherein the information enables the network administrator to further diagnose problems in the wireless network.

26. The wireless management network server of claim 24, wherein the remedial measures comprise increasing the minimum contention window size setting (CWmin) or the arbitration interframe space (AIFS) for the best-effort and background data queues at the wireless access point.

27. The wireless management network server of claim 24, wherein the remedial measures comprise reducing the CCA and SOP sensitivity of both the wireless access point and wireless clients wireless PHYs.

28. In a wireless network management server operative to communicate with a wireless access point in a wireless network, a method comprising:
receiving a report message comprising an uplink latency histogram or a downlink histogram and at least one of uplink and downlink metric data generated by one or more nodes of a wireless network;
analyzing the report messages to determine at least one metric or fault associated with the wireless network, comprising computing jitter using the uplink latency histogram or the downlink histogram; and
constructing a fault flowchart for the wireless network based on the analysis, wherein for each of the at least one fault determined during the analysis to be associated with the wireless network, the fault flowchart indicates a type and a cause of the fault.

29. The method of claim 28 further comprising
isolating a problem to a wireless access point based on the downlink metric data.

30. The method of claim 28 further comprising
determining whether the wireless network is operating with correct operational parameters relative to quality of service (QoS).

31. The method of claim 28 further comprising at least one of:
outputting a recommendation for one or more remedial measures;
automatically performing at least one of the remedial measures.

32. The method of claim 31 wherein the recommendation comprises information for a network administrator, and wherein the information enables the network administrator to further diagnose problems in the wireless network.

33. The method of claim 32 wherein the remedial measures comprise increasing the minimum contention window size setting (CWmin) or the arbitration interframe space (AIFS) for the best-effort and background data queues at the wireless access point.

34. The method of claim 31, wherein the remedial measures comprise reducing the CCA and SOP sensitivity of both the wireless access point and wireless clients wireless PHYs.

35. A wireless network management server operative to communicate with a wireless access point in a wireless network, the wireless network management server comprising:

means for receiving a report message comprising an uplink latency histogram or a downlink histogram and at least one of uplink and downlink metric data generated by one or more nodes of a wireless network;

means for analyzing the report messages to determine at least one metric or fault, comprising means for computing jitter using the uplink latency histogram or the downlink histogram; and means for construct a fault flowchart for the wireless network based on the analysis, wherein for each of the at least one fault determined during the analysis to be associated with the wireless network, the fault flowchart indicates a type and a cause of the fault.

\* \* \* \* \*